US012420439B2

(12) United States Patent
Li

(10) Patent No.: US 12,420,439 B2
(45) Date of Patent: Sep. 23, 2025

(54) NOSE HAIR TRIMMER HEAD

(71) Applicant: Ruian Daer Beauty Appliance Factory, Rui'an (CN)

(72) Inventor: Suo Li, Zhejiang (CN)

(73) Assignee: Ruian Daer Beauty Appliance Factory, Rui'an (CN)

( * ) Notice: Subject to any disclaimer, the term of this patent is extended or adjusted under 35 U.S.C. 154(b) by 171 days.

(21) Appl. No.: 18/399,580

(22) Filed: Dec. 28, 2023

(65) Prior Publication Data

US 2025/0214267 A1 Jul. 3, 2025

(51) Int. Cl.
*B26B 19/14* (2006.01)

(52) U.S. Cl.
CPC .................................. *B26B 19/148* (2013.01)

(58) Field of Classification Search
CPC .................................................... B26B 19/148
USPC .......................................................... 30/29.5
See application file for complete search history.

(56) References Cited

U.S. PATENT DOCUMENTS 3,829,966 A * 8/1974 Owens .................... B26B 19/16 30/29.5
7,401,406 B2 * 7/2008 Morisugi .............. B26B 19/148 30/29.5
2011/0072669 A1 * 3/2011 Morisugi .............. B26B 19/148 30/29.5
2011/0232096 A1 * 9/2011 Yabuuchi ................ B26B 19/38 30/29.5

FOREIGN PATENT DOCUMENTS

CN 210791079 * 6/2020

* cited by examiner

*Primary Examiner* — Phong H Nguyen

(57) ABSTRACT

A nose hair trimmer head includes a trimmer head shell, a trimmer head cover and a moving blade component, wherein the moving blade component includes a blade holder, a blade and a first spring piece. The first spring piece is arranged in the sliding groove of the blade holder. Both ends of the first spring piece are respectively in contact with the two blades to push the blade edges of the two blades to respectively abut against the inner side wall of the trimmer head cover. Adopting the above technical solution can realize the basic functions of the nose hair trimmer head while featuring a more stable structure and reducing vibration and noise.

10 Claims, 5 Drawing Sheets

NOSE HAIR TRIMMER HEAD

FIELD OF THE INVENTION

The present utility patent is used in the technical field of electric nose hair trimming technology, and in particular, for a nose hair trimmer head.

BACKGROUND OF THE INVENTION

The nose hair trimmer is a type of trimmer that came into being with people's increasing pursuit of hygienic conditions. The nose hair trimmer is used to trim excessively long nose hair, which can protect the hygienic conditions in the nasal cavity and is an indispensable cleaning and care tool in people's daily life. Among them, the nose hair trimmer head is an important part of the nose hair trimmer. At present, there are various nose hair device products on the market, but the general principles are similar. They are all realized by rotating the trimmer head driven by a miniature motor.

Existing electric nose hair trimmers include a host machine and a nose hair trimmer head. The nose hair trimmer head includes a trimmer head cover for extending into the nostril. The trimmer head cover is provided with a moving blade component. The host machine has a built-in drive motor and a built-in battery. The drive motor drives the moving blade component to rotate through the transmission structure, and the trimmer head cover is provided with a slot for nose hair to enter. The moving blade component rotates against the trimmer head cover and then the two achieve shearing at the edge of the slot, thereby achieving the function of trimming nose hair. The traditional moving blade component generally includes a blade that is used to abut against the inner side wall of the trimmer head cover. However, the blade of the general moving blade component is fixed or cannot move freely, and there are slight deviations in the rotation of the moving blade component and machining errors in the inner wall of the trimmer head cover, which cause the blade to be unable to adjust itself as the moving blade component rotates, ultimately causing the entire moving blade component to be unstable during rotation, easily causing vibration and noise. Therefore, it needs to be improve.

DETAILED DESCRIPTION

Aiming at the defects and deficiencies of the prior art, a nose hair trimmer head adopting in the present utility patent has the advantages of stable structure and reduction of vibration and noise.

To realize the above purposes, the technical solutions adopted by the present utility patent are: a nose hair trimmer head includes a trimmer head shell, a trimmer head cover and a moving blade component, wherein the trimmer head cover is arranged on the trimmer head shell; wherein the moving blade component, which is capable of rotating relative to the trimmer head cover, is arranged in the trimmer head shell and extends into the trimmer head cover; which is characterized in that the moving blade component includes: a blade holder, a blade and a first spring piece, wherein the blade holder has a sliding groove running through it along the directions of left and right; the sliding groove is located in the trimmer head cover, the blade holder is provided with a guiding column on the inner side wall of the sliding groove; there are two blades, and the two blades are mirrored in the sliding groove and can move left and right relative to the sliding groove, the blades are provided with a guiding strip hole for the guiding column to pass through, a blade edge is arranged on one side of the blade; the first spring piece is arranged in the sliding groove, and both ends of the first spring piece are respectively in contact with the two blades to push the blade edge of the two blades to respectively abut against the inner side walls of the trimmer head cover.

Two limited pieces are respectively provided on the two blades, and are arranged oppositely, the first spring piece is respectively sleeved outside the limited piece of the two blades.

Each blade is provided with two guiding strip holes, and the limited piece is located between the two guide strip holes.

The nose hair trimmer head further includes a transmission structure, wherein a part of the transmission structure is provided on the blade holder, and the other part is provided outside the trimmer head shell and is drivingly connected to the host of the electric nose hair trimmer.

The trimmer head shell includes a shell and a button cover, wherein the shell is arranged outside the moving blade component, the bottom cover is arranged at the bottom of the shell, a movable groove is arranged on the bottom of the bottom cover, and an accommodating groove is arranged on the bottom of the blade holder; the transmission structure includes: a first rotating block, a rotating axis and a second rotating block, wherein the first rotating block is disposed in the accommodating groove and is used to drive the blade holder to rotate synchronously, wherein the rotating axis passes through the movable groove and one end is integrally arranged with the first rotating block, wherein the second rotating block is rotatably arranged in the movable groove and is integrally arranged with one end of the rotating axis; a driving groove is arranged on the bottom of the second rotating block and is drivingly connected to the motor output axis of the electric nose hair trimmer.

A location part, which is limited in the shell, is arranged on the outer side wall of the blade holder, and a second spring piece is arranged in the accommodating groove and between the first rotating blocks.

A mounting column is protruding upward at the middle position of the top of the bottom cover; the mounting column is provided with a mounting groove connected with the movable groove; A bearing is arranged outside the rotating axis, and is arranged in the mounting groove.

A first inserting piece is arranged at the top edge of the bottom cover, a buckle piece protrudes outward on the side wall of the first inserting piece, the inner side wall of the shell is provided with a locking groove that engages with the buckle piece, the inner side wall of the shell is provided with a limited convex edge which is located above the bottom cover.

The trimmer head cover has a top wall and a side wall, the top of the trimmer head shell is provided with a mounting hole for the trimmer head cover to extend into, the top wall and side wall of the trimmer head cover are provided with a interconnected shaving groove for hair to extend into. A snap-on convex edge is arranged on the side wall of the trimmer head cover which is away from the top wall of the trimmer head cover, and a limited groove is provided on the inner side wall of the trimmer head shell close to the mounting hole for the snap-on convex edge to engage with.

The two blades are stacked in the front-to-back direction.

Adopting the above technical solutions, the beneficial effect of the present utility patent is: the two blades can translate along the direction of left and right in the sliding groove. At the same time, a guiding column is provided in the sliding groove that is inserted into the guiding strip hole on the blade to limit the movement of the blade in the sliding groove while enabling the two blades to rotate slightly relative to the guiding column. The first spring piece pushes the two blades to move away from each other so that the blade edge of the two blades abut against the inner side wall of the trimmer head cover, thereby enabling the blades to move freely. The two blades can automatically adapt to the uneven inner side wall of the trimmer head cover and the rotation deviation of the trimmer holder during operation, making the entire moving blade component smoother during rotation and reducing vibration and noise caused by uneven rotation.

DESCRIPTION OF THE DRAWINGS

In order to more clearly illustrate the technical solutions of the embodiment or the prior art of the present invention, a brief introduction of the figures that need to be used in the embodiment or the description of the prior art will be given below, apparently, the figures in the following description are only some embodiments of the present invention, for those of general person skilled in the art, on the basis of no inventive efforts, other figures can also be obtained based on these figures.

Reference signs in the figures: 1—trimmer head shell; 11—shell; 111—limited convex edge; 12—bottom cover; 121—mounting column; 122—first inserting piece; 123—buckle piece; 124—second inserting piece; 2—trimmer head cover; 21—snap-on convex edge; 3—moving blade component; 31—blade holder; 311—guiding column; 312—location part; 32—blade; 321—blade edge; 322—limited piece; 33—first spring piece; 4—transmission structure; 41—first rotating block; 42—rotating axis; 43—second rotating block; 44—bearing; 5—second spring piece; a—sliding groove; b—guiding strip hole; c—movable groove; d—accommodating groove; f—locking groove; g—mounting hole; h—shaving groove; i—limited groove; j—spring assembled hole; k—lead-in groove; m—snap-on groove; n—driving groove.

DETAILED DESCRIPTION OF THE PREFERRED EMBODIMENTS

Below is a further detailed description of the present utility patent based on the figures.

The present embodiment only shows an explanation of the present utility patent and it is not a limitation to the present utility patent. The skilled in the art can make modifications to this embodiment as needed without making any creative contributions after reading this specification, which are always protected by the patent law as long as they are within the scope of the claims of the present utility patent.

It should be noted that when an element is called as being "fixed to" or "arranged on" another element, it can be directly on the other element or indirectly on the other element. When an element is called as being "connected to" another element, it can be directly connected to the other element or indirectly connected to the other element.

It should be noticed that the terms "length", "width", "top", "bottom", "front", "rear", "left", "right", "vertical", "horizontal", "top", "bottom", "inside" and "outside" which indicates the orientations or positional relationships are based on the orientations or positional relationships shown in the figures. They are only for facilitating describing the present invention and simplifying the description, rather than indicating or implying that the device or component must have a specific orientation, construct and operate in a specific orientation, therefore, it understood as a limitation of the present invention.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present invention, "a plurality of" means two or more, unless otherwise specifically defined.

Figure 1:
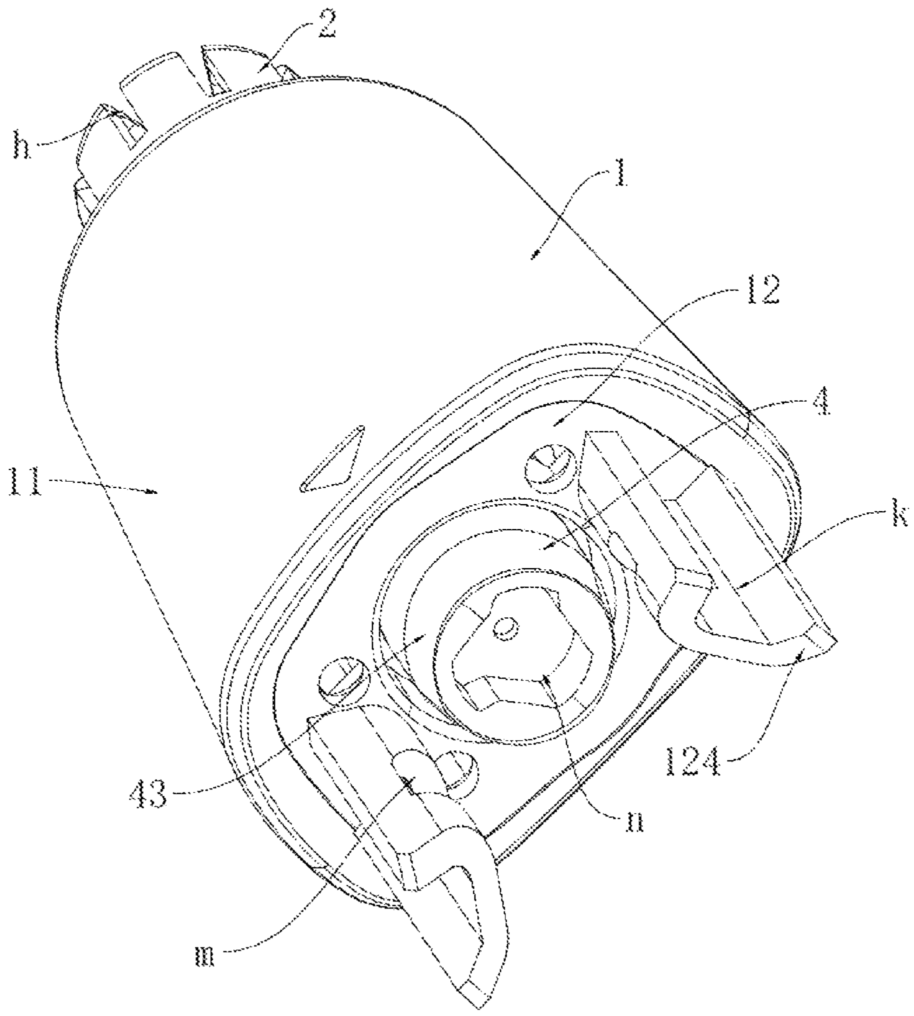
FIG. 1 is a schematic view of a nose hair trimmer head of the present invention.
Figure 2:
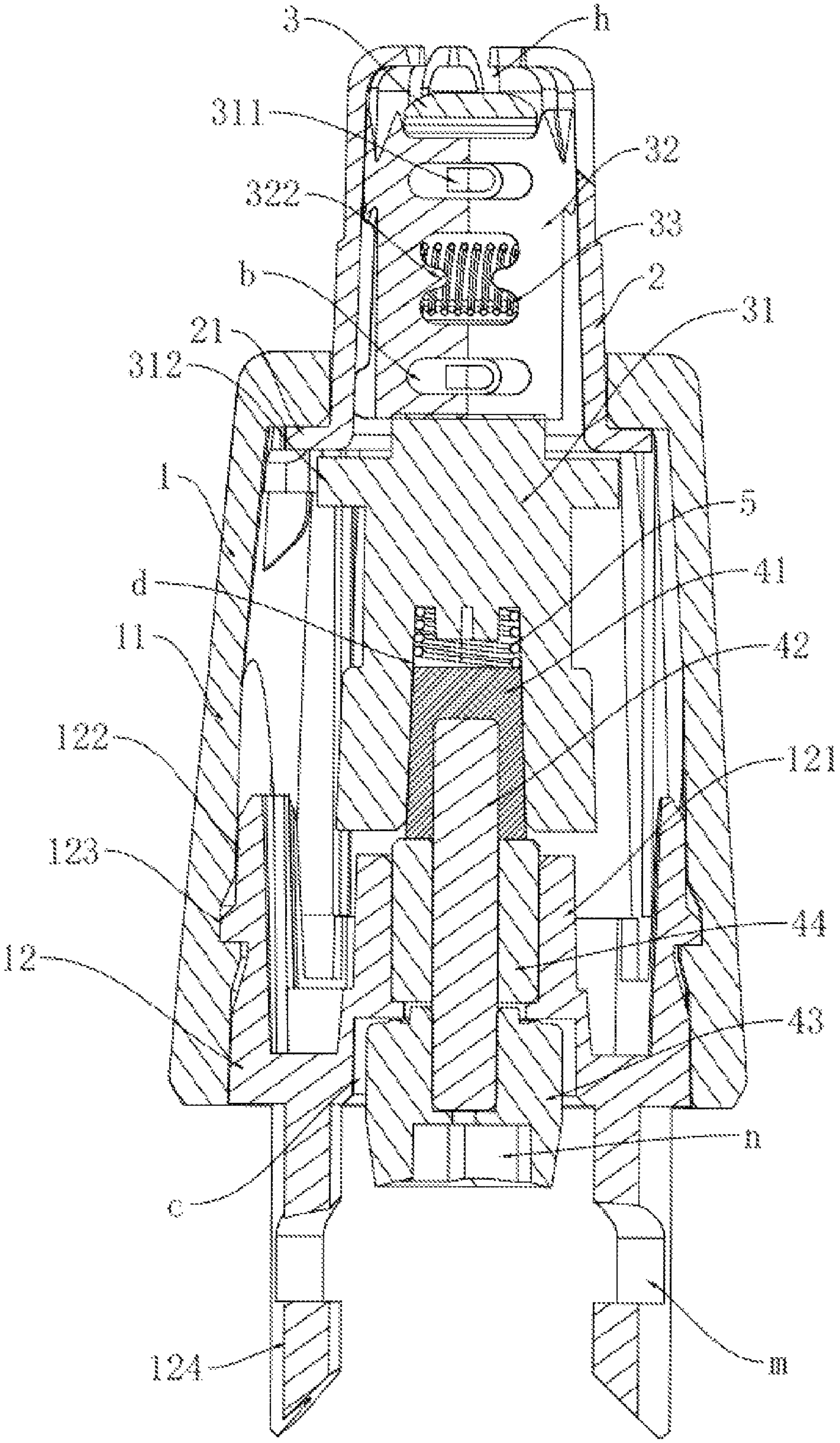
FIG. 2 is a cross-sectional view a nose hair trimmer head of the present invention.

This embodiment relates to a nose hair trimmer head, which is applied to an electric nose hair trimmer. Referring to FIGS. 1 and 2, the nose hair trimmer head includes a trimmer head shell 1, a trimmer head cover 2 and a moving blade component 3. The trimmer head cover 2 is arranged on the trimmer head shell 1, and the moving blade component 3 is arranged in the trimmer head shell 1 and extends into the trimmer head cover 2. It should be noted that the trimmer head shell 1 is installed on the host of the electric nose hair trimmer, and the moving blade component 3 is drivingly connected with the drive motor of the host. The moving blade component 3 is capable of rotating relative to the trimmer head cover 2 under the drive of the motor, thereby achieving nose hair trimming.

Figure 3:
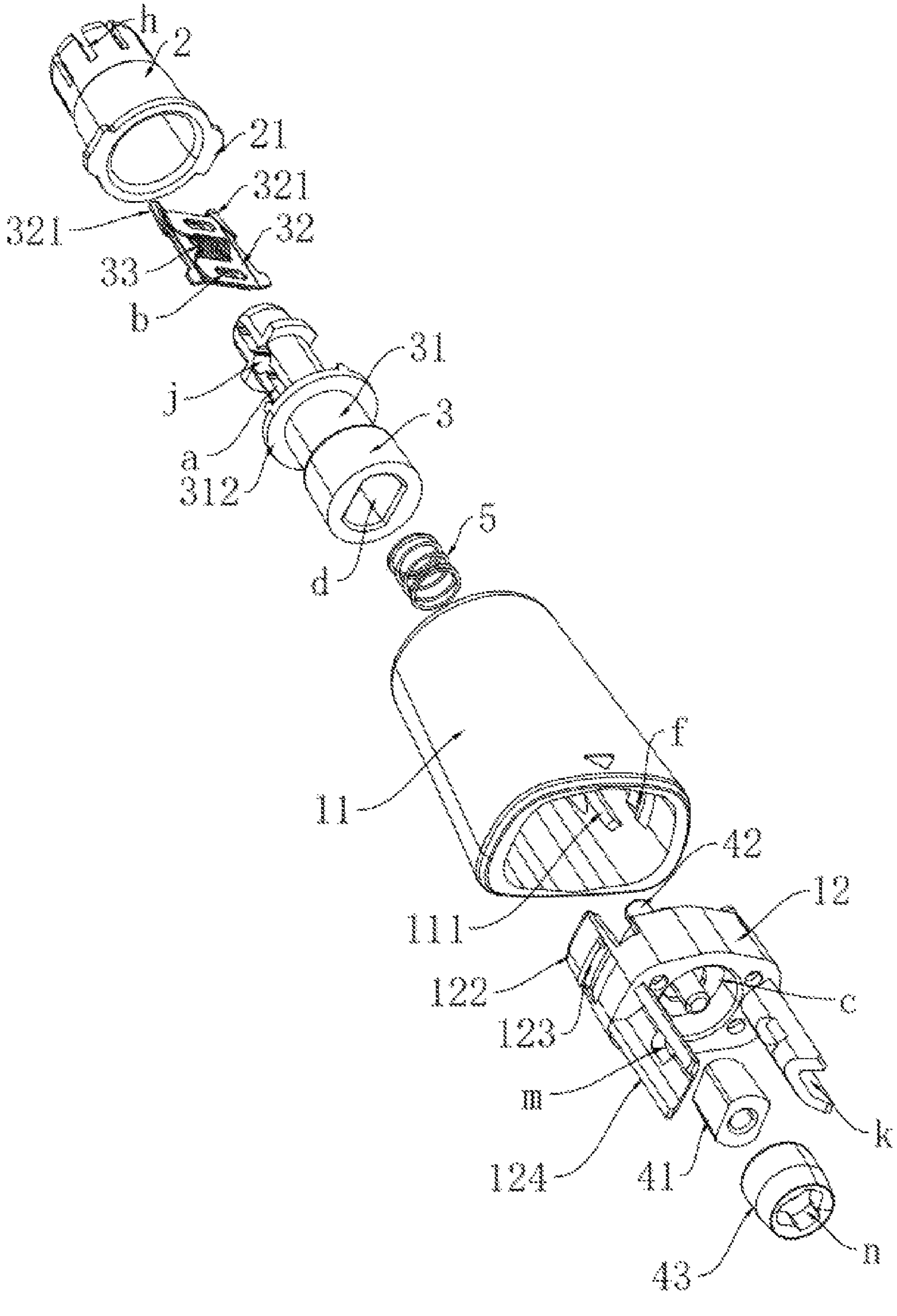
FIG. 3 is a exploded view of the present invention.
Figure 4:
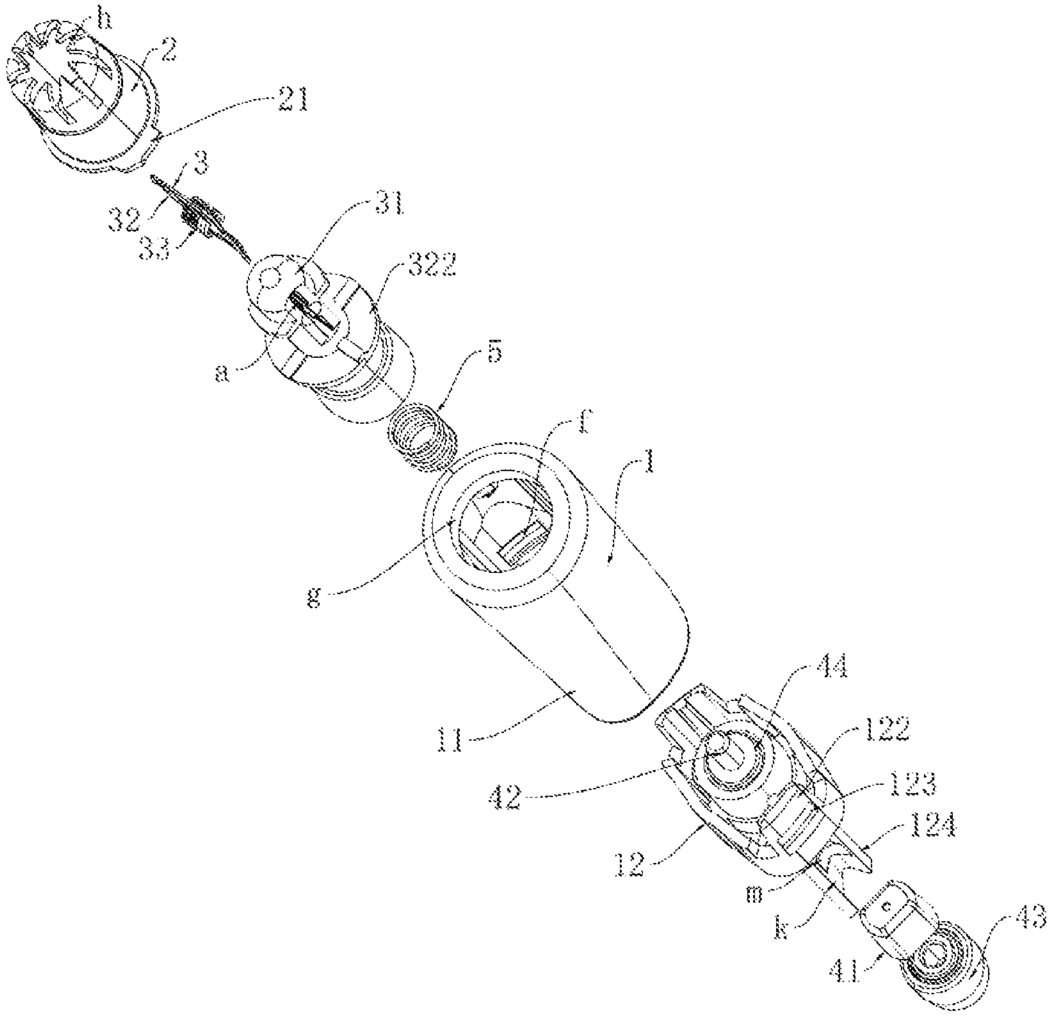
FIG. 4 is a exploded view of another direction of the present invention.
Figure 5:
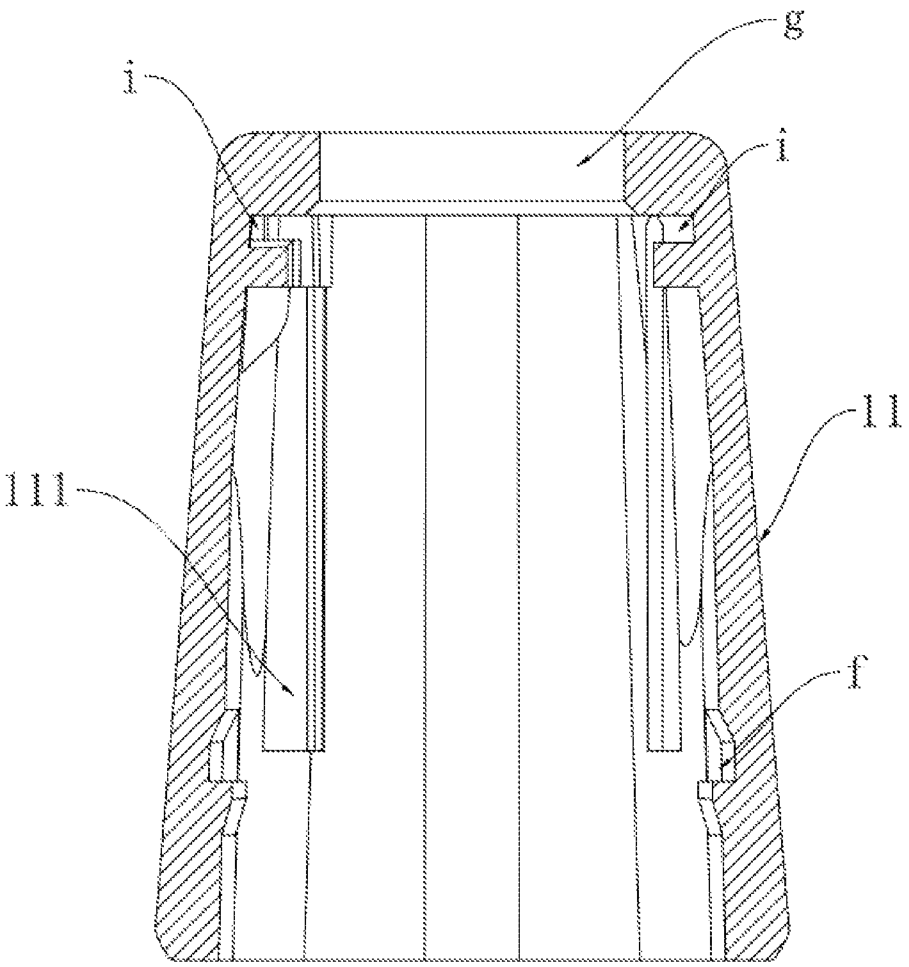
FIG. 5 is a cross-sectional view of a shell of the present invention.

Referring to FIGS. 2-4, the moving blade component 3 includes: a blade holder 31, a blade 32 and a first spring piece 33. The blade holder 31 has a sliding groove a running through it along the direction from left and right. The sliding groove a is located in the trimmer head cover 2. The blade holder 31 is provided with a guiding column 311 on the inner side wall of the sliding groove a. There are two blades 32. The two blades 32 are mirrored in the sliding groove at the two sides. The two blades 32 can move left and right relative to the sliding groove a. The blade 32 is provided with a guiding strip hole b for the guiding column 311 to pass through, so that the blade 32 can translate left and right relative to the blade holder 31. A blade edge 321 is provided on one side of the blade 32. The first spring piece 33 is provided in the sliding groove a and is located between the two blades 32, and the two ends of the first spring piece 33 are respectively in contact with the two blades 32 to push the blade edge 321 of the two blades 32 to respectively abut against the inner side walls of the trimmer head cover 2. Optionally, the two blades 32 are stacked in the front-to-back direction. The width of the guiding strip hole b is greater than the width of the guiding column 311, and the length of the guiding strip groove is greater than the length of the guiding column 311. The cross-section of the blade edge 321 is V-shaped, and the length of the cross-section of the blade edge 321 gradually decreases from top to bottom.

In this way, during the working process, the two blades 32 can translate along the direction of left and right in the sliding groove. At the same time, a guiding column 311 is provided in the sliding groove that is inserted into the guiding strip hole b on the blade 32 to limit the movement of the blade 32 in the sliding groove and prevent the blades

32 from excessive upward or downward movement while enabling the two blades 32 to rotate slightly relative to the guiding column 311. The first spring piece 33 pushes the two blades 32 to move away from each other so that the blade edge 321 of the two blades 32 abut against the inner side wall of the trimmer head cover 2, thereby enabling the blades 32 to move freely. The two blades 32 can automatically adapt to the uneven inner side wall of the trimmer head cover 2 and the rotation deviation of the trimmer holder 31 during operation, making the entire moving blade component 3 smoother during rotation and reducing vibration and noise caused by uneven rotation.

Optionally, in order to make the spring piece stably contact with the blade 32, referring to FIG. 2-4, two limited pieces 322 are respectively arranged on the two blades 32, and the two limited pieces 322 are arranged oppositely. The first spring pieces 33 is respectively sleeved outside the limited piece 322 of the two blades 32. Optionally, the first spring piece 33 is a cylindrical spring.

Preferably, in order to avoid excessive rotation of the blades 32 relative to the guiding column 311 and to make the translation left and right of the blade 32 more stable, referring to FIG. 2-4, each blade 32 is provided with two guiding strip holes b. A spring assembled hole j for the first spring piece 33 to be inserted runs through the sliding groove a along direction of left and right. The limited piece 322 is located in the spring assembled hole j and between the two guiding strip holes b. Optionally, the limited piece 322 of the blades 32 is located in the middle of the blades 32, and the limited piece 322 of one blade 32 faces to the limited piece 322 of the other blade 32. The thickness of the guiding column 311 is greater than the thickness of the blade 32. In one embodiment, two guiding columns 311 are arranged on the front and rear side walls of the inner side wall of the sliding groove a. One end of the guiding column 311 is integrally formed with the blade holder 31, so that the guiding column 311 are stably fixed in the sliding groove to prevent the guiding column 311 from being detached from the blade holder 31. In one embodiment, the blade 32 is provided with guiding strip holes b opposite to each other, and the blade holder 31 has a guiding column 311 penetrating through the guiding strip hole b in forward and backward direction.

Optionally, in order to realize the basic functions of the electric nose hair trimmer, referring to FIG. 2-4, the nose hair trimmer head further includes a transmission structure 4. One part of the transmission structure 4 is arranged on the blade holder 31, and the other part is arranged outside the trimmer head shell 1 and is drivingly connected to the drive motor of the host of the electric nose hair trimmer.

Preferably, in order to realize that the transmission structure 4 drives the moving blade component 3 to rotate under the drive of the driving motor to trim hair, referring to FIGS. 2-5, the trimmer head shell 1 includes: a shell 11 and a bottom cover 12, wherein the shell 11 covers outside the moving blade component 3 and the bottom cover 12 is located at the bottom of the shell 11. The bottom of the bottom cover 12 is provided with a movable groove c. The bottom of the blade holder 31 is provided with an accommodating groove d. The accommodating groove d is non-circular. The transmission structure 4 includes: a first rotating block 41, a rotating axis 42 and a second rotating block 43. The first rotating block 41 is arranged in the accommodating groove d and is used to drive the blade holder 31 to rotate synchronously. The rotating axis 42 passes through the movable groove c, and one end is integrally provided with the first rotating block 41. The second rotating block 43 is rotatably disposed in the movable groove c and is integrally arranged with one end of the rotating axis 42. The bottom of the second rotating block 43 is provided with a driving groove n that is drivingly connected to the motor output axis of the electric nose hair trimmer. The driving groove n is non-circular and can be in the shape of triangle, rectangle, spline or other polygonal shapes. It should be noted that the output axis of the driving motor is plugged into the driving groove n. When the output axis of the driving motor rotates, it drives the second rotating block 43 to rotate. The second rotating block 43 drives the first rotating block 41 to rotate through the rotating axis 42. The rotation of the first rotating block 41 drives the blade holder 31 to rotate. Driven by the blade holder 31, the blade 32 rotates relative to the trimmer head cover 2 to achieve cutting and trimming of hair.

Optionally, in order to prevent the blade holder 31 from driving the blade 32 into the trimmer head cover 2 excessively which may cause the blade 32 to protrude from the trimmer head cover 2 and cause the blade 32 to scratch the user's skin, and to prevent the blade 32 from moving downward and away from the trimmer head cover 2 driven by the blade holder 31, which may affect the hair trimming effect. Referring to FIGS. 2-5, the outer side wall of the blade holder 31 is provided with a location part 312 located in the shell 11, A second spring piece 5 is arranged in the accommodating groove d and between the first rotating blocks 41. The second spring piece 5 is provided to ensure that the location part 312 of the blade holder 31 abuts the bottom surface of the trimmer head cover 2. Optionally, the second spring piece 5 is a cylindrical spring. The location part 312 is integrally formed with the blade holder 31, and the location part 312 is disk-shaped. The diameter of the location part 312 is larger than the diameter of the cavity of the trimmer head cover 2. A plurality of semi-cylindrical limited columns are provided at intervals on the top surface of the location part 312. The configuration of the limited columns reduces the friction between the location part 312 and the trimmer head cover 2, making the rotation of the blade holder 31 smoother.

Optionally, referring to FIGS. 2-4, there is a mounting column 121 protruding upward at the middle position of the top of the bottom cover 12. The mounting column 121 is provided with a mounting groove connected with the movable groove c, and the rotating axis 42 is provided with a bearing 44, the bearing 44 is arranged in the mounting groove. The configuration of the bearing 44 not only supports the rotating axis 42 but also reduces the friction during the rotation of the rotating axis 42, so that the blade holder 31 rotates more smoothly under the driving of the rotating axis 42.

Optionally, in order to realize that the bottom cover 12 can be stably covered on the opening at the bottom of the shell 11, referring to FIGS. 2-4, the top edge of the bottom cover 12 is provided with a first inserting piece 122 for inserting into the opening of the shell 11. A buckle piece 123 protrudes outward from the side wall of the first inserting piece 122, and a locking groove f is provided on the inner side wall of the shell 11 to engage with the buckle piece 123. In some embodiments, two first inserting pieces 122 are provided, and the two first inserting pieces 122 are respectively located on the left and right sides of the bottom cover 12 and are arranged oppositely. Optionally, a limited convex edge 111 is provided on the inner side wall of the shell 11. The limited convex edge 111 is located above the bottom cover 12. The limited convex edge 111 is provided to prevent the bottom cover 12 from being excessively inserted into the shell 11.

Optionally, in order to install the nose hair trimmer head on the host of the electric nose hair trimmer, a lead-in groove k is provided on the host, and the lead-in groove k extends downward from the side of the motor axis close to the drive motor on the host, referring to FIGS. 2-4, a second inserting piece 124 extends downward from the bottom edge of the bottom cover 12. The second inserting piece 124 extends downward from the edge of the bottom surface of the bottom cover 12. The second inserting piece 124 is used in the lead-in groove k of the host. A guiding groove is provided on the outside of the second inserting piece 124. The second inserting piece 124 has a locking groove m penetrating through it. Optionally, a locking block, which is capable of engaging with the locking groove m, is provided on the inner side wall of the lead-in groove k in the host. The lead-in groove k is V-shaped. Optionally, two second inserting pieces 124 are provided, and the two second inserting pieces 124 are relatively located on the left and right sides of the bottom surface of the bottom cover 12 Optionally, in order to allow hair to enter through the trimmer head cover 2 for trimming by the moving blade component 3, referring to FIGS. 4 and 5, the trimmer head cover 2 has a top wall and a side wall. The top of the trimmer head shell 1 is provided with a mounting hole g for the trimmer head cover 2 to extend into, and the top and side walls of the trimmer head cover 2 are provided with interconnected shaving grooves h for hair to extend into. The side wall of the trimmer head cover 2 is provided with a snap-on convex edge 21 on the side away from the top wall of the trimmer head cover 2. The inner wall of the trimmer head shell 1 is provided with a limited groove i for the snap-on convex edge 21 to engage with on the side close to the mounting hole g. Optionally, there are two snap-on convex edges 21, the two snap-on convex edges 21 are arranged oppositely, and the diameter of the mounting hole g is smaller than the distance between the two snapon convex edges 21.

The above only aims to illustrate the technical solution of the present utility patent without limitation. Any other modifications or equivalent replacements of the technical solution of the present utility patent made by ordinary skilled in the art should be included in the scope of the claims of the present utility patent as long as they do not deviate from the technical solution spirit and scope of the present utility patent.

The invention claimed is:

1. A nose hair trimmer head includes a trimmer head shell, a trimmer head cover and a moving blade component, wherein the trimmer head cover is arranged on the trimmer head shell; wherein the moving blade component, which is capable of rotating relative to the trimmer head cover, is arranged in the trimmer head shell and extends into the trimmer head cover; which is characterized in that the moving blade component includes: a blade holder, two blades and a first spring piece, wherein the blade holder has a sliding groove running through it along the direction of left and right; the sliding groove is located in the trimmer head cover, the blade holder is provided with a guiding column on the inner side wall of the sliding groove; the two blades are mirrored in the sliding groove and can move left and right relative to the sliding groove, the blades are provided with a guiding strip hole for the guiding column to pass through, a blade edge is arranged on one side of the blade; the first spring piece is arranged in the sliding groove, and both ends of the first spring piece are respectively in contact with the two blades to push the blade edges of the two blades to respectively abut against the inner side walls of the trimmer head cover.

2. The nose hair trimmer head according to claim 1, is characterized in that, two limited pieces are respectively provided on the two blades, and the two limited pieces are arranged oppositely, the first spring piece is respectively sleeved outside the limited piece of the two blades.

3. The nose hair trimmer head according to claim 2, is characterized in that, each blade is provided with two guiding strip holes, and the limited piece is located between the two guiding strip holes.

4. The nose hair trimmer head according to claim 1, is characterized in that, the nose hair trimmer head further includes a transmission structure, wherein a part of the transmission structure is provided on the blade holder, and the other part is provided outside the trimmer head shell and is drivingly connected to the host of the electric nose hair trimmer.

5. The nose hair trimmer head according to claim 4, is characterized in that, the trimmer head shell includes a shell and a bottom cover, wherein the shell is arranged outside the moving blade component, the bottom cover is arranged at the bottom of the shell, a movable groove is arranged on the bottom of the bottom cover, and an accommodating groove is arranged on the bottom of the blade holder; the transmission structure includes: a first rotating block, a rotating axis and a second rotating block, wherein the first rotating block is arranged in the accommodating groove and is used to drive the blade holder to rotate synchronously; wherein the rotating axis passes through the movable groove and one end is integrally arranged with the first rotating block; wherein the second rotating block is rotatably arranged in the movable groove and is integrally arranged with one end of the rotating axis; a driving groove is arranged on the bottom of the second rotating block and is drivingly connected to the motor output axis of the electric nose hair trimmer.

6. The nose hair trimmer head according to claim 5, is characterized in that, a location part is arranged in the shell which is arranged on the outer side wall of the blade holder, and a second spring piece is arranged in the accommodating groove and between the first rotating blocks.

7. The nose hair trimmer head according to claim 6, is characterized in that, a mounting column is protruding upward at the middle position of the top of the bottom cover; the mounting column is provided with a mounting groove connected with the movable groove; a bearing is arranged outside the rotating axis, and is arranged in the mounting groove.

8. The nose hair trimmer head according to claim 5, is characterized in that, a first inserting piece is arranged at the top edge of the bottom cover, a buckle piece protrudes outward on the side wall of the first inserting piece, the inner side wall of the shell is provided with a locking groove that engages with the buckle piece, the inner side wall of the shell is provided with a limited convex edge which is located above the bottom cover.

9. The nose hair trimmer head according to claim 1, is characterized in that, the trimmer head cover has a top wall and a side wall, the top of the trimmer head shell is provided with a mounting hole for the trimmer head cover to extend into, the top wall and side wall of the trimmer head cover are provided with a interconnected shaving groove for hair to extend into, a snap-on convex edge is arranged on the side wall of the trimmer head cover which is away from the top wall of the trimmer head cover, and a limited groove is provided on the inner side wall of the trimmer head shell close to the mounting hole for the snap-on convex edge to engage with.

10. The nose hair trimmer head according to claim 1, is characterized in that, the two blades are stacked in the front-to-back direction.

* * * * *